US008665817B2

(12) United States Patent
Seo et al.

(10) Patent No.: US 8,665,817 B2
(45) Date of Patent: Mar. 4, 2014

(54) METHOD AND APPARATUS FOR MODE SWITCHING BETWEEN A MULTI-CELL COORDINATED COMMUNICATION MODE AND A SINGLE-CELL MIMO COMMUNICATION MODE

(75) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 13/497,248

(22) PCT Filed: Oct. 5, 2010

(86) PCT No.: PCT/KR2010/006792
§ 371 (c)(1),
(2), (4) Date: Mar. 20, 2012

(87) PCT Pub. No.: WO2011/046317
PCT Pub. Date: Apr. 21, 2011

(65) Prior Publication Data
US 2012/0189077 A1    Jul. 26, 2012

Related U.S. Application Data

(60) Provisional application No. 61/251,670, filed on Oct. 14, 2009.

(51) Int. Cl.
*H04W 4/00* (2009.01)
(52) U.S. Cl.
USPC .......................................... 370/330; 370/478
(58) Field of Classification Search
USPC .................... 370/328, 330, 334, 478, 236
See application file for complete search history.

(56) References Cited

U.S. PATENT DOCUMENTS 8,515,435 B2 * 8/2013 Krasny et al. ................. 455/450
2009/0046801 A1 2/2009 Pan et al.

(Continued)

FOREIGN PATENT DOCUMENTS

KR     1020090106975     10/2009

OTHER PUBLICATIONS

Q. Wang et al., "Coordinated Multiple Points Transmission for LTE-Advanced Systems", 5th International Conference on Wireless Communications, Networking and Mobile Computing, Sep. 2009.

(Continued)

*Primary Examiner* — Brian D Nguyen
(74) *Attorney, Agent, or Firm* — Lee, Hong, Degerman, Kang & Waimey

(57) ABSTRACT

The present invention relates to a wireless communication system, and more particularly, discloses a method and an apparatus for mode switching between a multi-cell coordinated communication mode and a single-cell MIMO communication mode. A method for dynamically switching a communication mode according to one embodiment of the present invention comprises: a step of generating and transmitting first feedback information in accordance with a first communication mode; a step of switching the first communication mode into a second communication mode interlocked with the first communication mode; and a step of generating and transmitting second feedback information in accordance with the second communication mode. The first communication mode is one of a multi-cell coordinated multi-point (CoMP) communication mode and a single-cell multi-input multi-output (MIMO) communication mode, and the second communication mode is the other of the multi-cell coordinated multi-point (CoMP) communication mode and the single-cell multi-input multi-output (MIMO) communication mode. The switching step can be performed without signaling from a base station.

14 Claims, 12 Drawing Sheets

(56) References Cited

U.S. PATENT DOCUMENTS

| | | | |
|---|---|---|---|
| 2010/0039951 A1* | 2/2010 | She et al. | 370/252 |
| 2010/0074183 A1* | 3/2010 | Chen et al. | 370/328 |
| 2010/0159972 A1* | 6/2010 | Cho et al. | 455/501 |
| 2011/0009105 A1* | 1/2011 | Lee et al. | 455/418 |
| 2011/0075611 A1* | 3/2011 | Choi | 370/329 |

OTHER PUBLICATIONS

D.J. Love et al., "An Overview of Limited Feedback in Wireless Communication Systems", IEEE Journal on Selected Areas in Communications, Oct. 2008.

* cited by examiner

FIG. 8
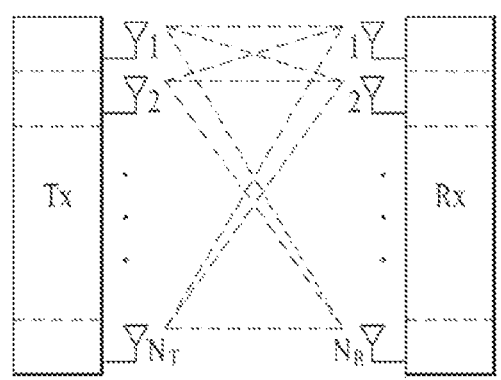
(a)
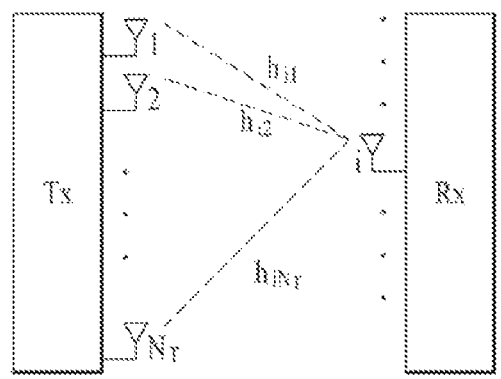
(b)

METHOD AND APPARATUS FOR MODE SWITCHING BETWEEN A MULTI-CELL COORDINATED COMMUNICATION MODE AND A SINGLE-CELL MIMO COMMUNICATION MODE

CROSS-REFERENCE TO RELATED APPLICATIONS

This application is the National Stage filing under 35 U.S.C. 371 of International Application No. PCT/KR2010/006792, filed on Oct. 5, 2010, which claims the benefit of U.S. Provisional Application Ser. No. 61/251,670, filed on Oct. 14, 2009, the contents of which are all incorporated by reference herein in their entirety.

TECHNICAL FIELD

The following description relates to a wireless communication system, and more particularly, to a method and apparatus for mode switching between a multi-cell coordinated communication mode and a single-cell MIMO communication mode.

BACKGROUND ART

Multi-Input Multi-Output (MIMO) is a technique for improving data transmission/reception efficiency using multiple transmit antennas and multiple receive antennas, instead of employing one transmit antenna and one receive antenna. When a single antenna is used, a receiving side receives data through a single antenna path. However, the receiving side receives data through multiple paths when multiple antennas are used, and therefore, a data transmission rate and data transmission amount can be improved and coverage can be increased.

A single-cell MIMO operation may be divided into a Single User-MIMO (SU-MIMO) scheme in which one User Equipment (UE) receives a downlink signal in one cell and a Multi User-MIMO (MU-MIMO) scheme in which two or more UEs receive a downlink signal in one cell.

Meanwhile, much research into a Coordinated Multi-Point (CoMP) system has been carried out to improve throughput of a user located at a cell boundary by applying improved MIMO transmission in a multi-cell environment. Application of the CoMP system can reduce inter-cell interference in a multi-cell environment and can improve overall system performance.

A CoMP scheme may be classified into, for example, a Joint Processing (JP) scheme in which downlink data to be transmitted to a specific UE is shared by all of CoMP coordinated cells and a Coordinated BeamForming (CBF) scheme in which downlink data exists only in one cell. The JP scheme may further be divided into a Joint Transmission (JT) scheme in which all coordinated cells participate in signal transmission and a Cooperative Silencing (CSL) scheme in which only one cell participates in signal transmission and the other cells stop transmitting signals to reduce interference. In the CBF scheme, coordinated cells which do not transmit signals to a UE may reduce inter-cell interference by way of determining a beamforming matrix of the UE receiving signals therefrom so that the corresponding UE is subject to less interference.

DETAILED DESCRIPTION OF THE INVENTION

Technical Problems

A multi-cell CoMP operation may be considered extension of a single-cell MIMO operation. In other words, the multi-cell CoMP operation may be regarded operation as a virtual MIMO system by grouping a plurality of spatially separated BSs (or cells) into one. From this viewpoint, a communication scheme of the multi-cell CoMP operation has a close relationship with a communication scheme of a single-cell MIMO operation. Considering this, it is an object of the present invention to provide a method and apparatus for mode switching between a multi-cell CoMP communication mode and a single-cell MIMO communication mode.

It will be appreciated by persons skilled in the art that that the technical objects that can be achieved through the present invention are not limited to what has been particularly described hereinabove and other technical objects of the present invention will be more clearly understood from the following detailed description.

Technical Solutions

To achieve the above technical object, a method for dynamically switching a communication mode in accordance with an embodiment of the present invention includes generating and transmitting first feedback information according to a first communication mode; switching from the first communication mode to a second communication mode which has a corresponding relationship with the first communication mode; and generating and transmitting second feedback information according to the second communication mode, wherein the first communication mode is one of a multi-cell Coordinated Multi-Point (CoMP) communication mode and a single-cell Multi-Input Multi-Output (MIMO) communication mode, and the second communication mode is the other one except for the first communication mode out of the CoMP communication mode and the single-cell MIMO mode, and wherein the switching is performed without relying on signaling from a base station.

The corresponding relationship of the first communication mode and the second communication mode is configured between a CoMP communication scheme supporting high rank transmission and a single-cell MIMO communication scheme supporting high rank transmission, and between a CoMP communication scheme supporting low rank transmission and a single-cell MIMO communication scheme supporting low rank transmission.

The CoMP communication scheme supporting high rank transmission and the single-cell MIMO communication scheme supporting high rank transmission are a CoMP Joint Transmission (JT) scheme and a single-cell Single User (SU)-MIMO scheme, respectively, and wherein the CoMP communication scheme supporting low rank transmission and the single-cell MIMO communication scheme supporting low rank transmission are a CoMP Coordinated Beamforming (CBF) scheme and a single-cell Multi User (MU)-MIMO scheme, respectively.

The first feedback information and the second feedback information are generated using the same feedback codebook.

The first feedback information is generated using a first feedback codebook, the second feedback information is generated using a second feedback codebook, and one of the first feedback codebook and the second feedback codebook is composed of a subset of the other one.

A feedback codebook used in the single-cell MIMO communication mode is configured as a subset of a feedback codebook used in the CoMP communication mode.

Feedback information in the single-cell MIMO communication mode is a subset of feedback information in the CoMP communication mode.

When the corresponding relationship of the first communication mode and the second communication mode is configured between a CoMP JT scheme and a single-cell SU-MIMO scheme, the first feedback information and the second feedback information are generated using a feedback codebook including unitary matrices.

When the corresponding relationship of the first communication mode and the second communication mode is configured between a CoMP CBF scheme and a single-cell MU-MIMO scheme, the first feedback information and the second feedback information are generated using a feedback codebook including non-unitary matrices.

When the corresponding relationship of the first communication mode and the second communication mode is configured between a CoMP CBF scheme and a single-cell MU-MIMO scheme, the first feedback information and the second feedback information are generated using a feedback codebook having higher granularity than when the corresponding relationship of the first communication mode and the second communication mode is configured between a CoMP JT scheme and a single-cell SU-MIMO scheme.

The feedback codebook having higher granularity is configured by a feedback codebook of greater size, a hierarchical codebook, or an adaptive codebook.

The first feedback information and the second feedback information are generated based on the same hypothesis about Channel Quality Indicator (CQI) calculation.

The same MIMO transmission scheme is used in the first communication mode and the second communication mode.

To achieve the above technical object, a user equipment for dynamically switching communication modes in accordance with another embodiment of the present invention includes a reception module for receiving a downlink signal from a base station, a transmission module for transmitting an uplink signal to the base station, and a processor for controlling the user equipment including the reception module and the transmission module, wherein the processor generates first feedback information according to a first communication mode and generates second feedback information according to a second communication mode, transmits the first feedback information through the transmission module when the user equipment operates in the first communication mode and transmits the second feedback information through the transmission module when the user equipment operates in the second communication mode, and is configured to perform switching between the first communication mode and the second communication mode, wherein the first communication mode and the second communication mode are communication modes having a corresponding relationship, wherein the first communication mode is one of a multi-cell Coordinated Multi-Point (CoMP) communication mode and a single-cell Multi-Input Multi-Output (MIMO) communication mode, and the second communication mode is the other one except for the first communication mode out of the CoMP communication mode and the single-cell MIMO mode, and wherein switching between the first communication mode and the second communication mode is performed without depending on signaling from a base station.

The above-described general description of the present invention and a detailed description thereof which will be described are exemplary and are for additional description for invention written in claims.

Advantageous Effects

According to the above-described aspects of the present invention, dynamic mode switching between a multi-cell CoMP communication mode and a single-cell MIMO communication mode can be efficiently performed.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 8 is a diagram illustrating the configuration of a radio communication system having multiple antennas;

BEST MODE FOR CARRYING OUT THE INVENTION

Figure 1:
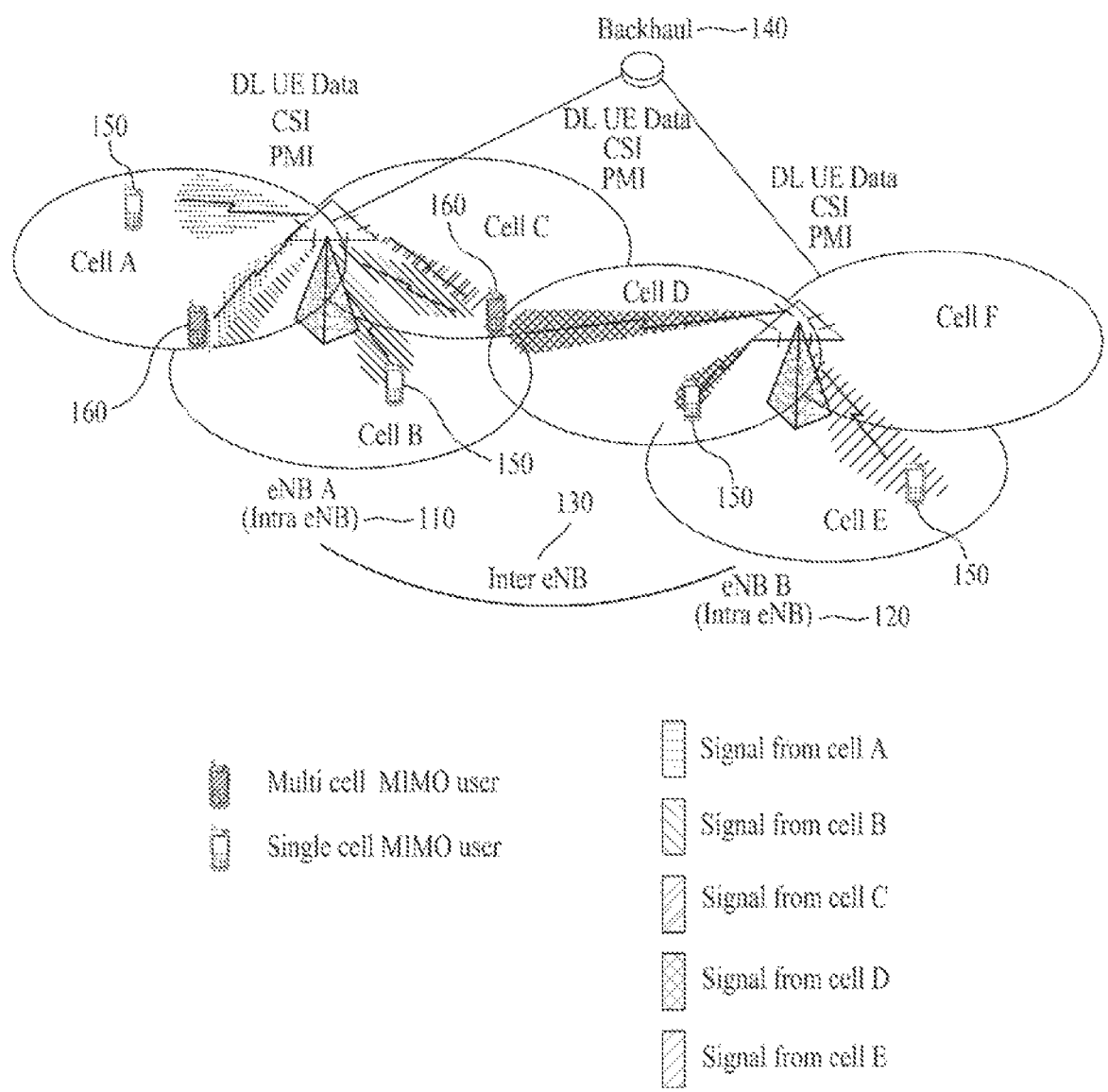
FIG. 1 is a diagram conceptually illustrating a CoMP operation of an intra eNB and an inter eNB.

The following embodiments are achieved by combination of structural elements and features of the present invention in a predetermined manner. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In exemplary embodiments of the present invention, a description is given of a data transmission and reception relationship between a base station and a terminal. Here, the base station refers to a terminal node of a network communicating directly with the terminal. In some cases, a specific operation described as being performed by the base station may be performed by an upper node of the base station.

In other words, it is apparent that, in a network comprised of a plurality of network nodes including a base station, various operations performed for communication with a terminal may be performed by the base station, or network nodes other than the base station. The term 'base station' may be replaced with terms such as fixed station, Node B, eNode B (eNB), and Access Point (AP). Also, in the following description, the term 'base station' may be used as a concept including a cell or a sector. For example, in the present invention, a serving base station may be referred to as a serving cell, and a coordinated base station may be referred to as a coordinated cell. Also, the term 'terminal' may be replaced with terms such as User Equipment (UE), Mobile Station (MS), Mobile Subscriber Station (MSS), and Subscriber Station (SS).

Specific terms disclosed in the present invention are proposed to aid in understanding the present invention, and the use of these specific terms may be changed to another format within the technical scope or spirit of the present invention.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

Exemplary embodiments of the present invention are supported by standard documents disclosed in at least one of wireless access systems including an Institute of Electrical and Electronics Engineers (IEEE) 802 system, a $3^{rd}$ Generation Partnership Project (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by the above-mentioned documents.

The following technique can be used for a variety of radio access systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the Universal Mobile Telecommunications System (UMTS). 3GPP LTE is a part of the E-UMTS (Evolved UMTS), which uses E-UTRA. 3GPP LTE employs OFDMA in downlink and employs SC-FDMA in uplink. LTE-A is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, technical features of the present invention are not limited thereto.

A Coordinated Multi-Point (CoMP) system will now be described with reference to FIG. 1. FIG. 1 is a diagram conceptually illustrating a CoMP operation of an intra eNB and an inter eNB.

Referring to FIG. 1, there are intra eNBs 110 and 120 and an inter eNB 130 in a multi-cell environment. In an LTE system, an intra eNB includes several cells (or sectors). Cells covered by an eNB to which a specific UE belongs are in an intra eNB (110 or 120) relationship with the specific UE. In other words, cells sharing the same eNB as an eNB managing a cell to which a UE belongs are cells corresponding to the intra eNB 110 or 120, whereas cells under different eNBs are cells corresponding to the inter eNB 130. Cells (i.e. intra eNB) based on the same eNB as an eNB to which a specific UE belongs exchange information (e.g. data and Channel State information (CSI)) with each other without an additional interface between schedulers of the respective cells. Cells (i.e. inter eNB) in different eNBs exchange information between the cells through a backhaul 140. As illustrated in FIG. 1, a single-cell MIMO user 150 in a single cell may communicate with one serving eNB in one cell (Cell A, Cell B, Cell C, Cell D, or Cell E), and a multi-cell MIMO user 160 located at a cell boundary may communicate with a plurality of serving eNBs in multiple cells (Cell A and Cell B, or Cell B, Cell C and Cell D).

A CoMP system refers to a system for improving throughput of a user located at a cell boundary by applying improved MIMO transmission in a multi-cell environment. If the CoMP system is applied, it is possible to reduce inter-cell interference in a multi-cell environment.

The CoMP scheme may be classified into, for example, a Joint Processing (JP) scheme in which downlink data to be transmitted to a specific UE is shared by all of CoMP coordinated cells and a Coordinated Beamforming (CBF) scheme in which downlink data exists only in one cell. The JP scheme may further be divided into a Joint Transmission (JT) scheme in which all coordinated cells participate in signal transmission and a Cooperative Silencing (CSL) scheme in which only one cell participates in signal transmission and the other cells stop transmitting signals to reduce interference. In the CBF scheme, coordinated cells which do not transmit signals to a UE can reduce inter-cell interference by determining a beamforming matrix of a UE receiving signals therefrom so that the corresponding UE is subject to less interference.

If such a CoMP system is used, a UE may commonly receive data from multi-cell eNBs. In addition, the eNBs may simultaneously support one or more UEs using the same radio frequency resource to improve system performance. Also, the eNB may perform a Space Division Multiple Access (SDMA) method based on CSI between the eNB and the UE.

In the CoMP system, a serving eNB and one or more coordinated eNBs are connected to a scheduler via a backbone network. The scheduler may operate by receiving channel information about a channel status between each UE and coordinated eNBs through the backbone network, measured by each eNB. For example, the scheduler may schedule information for a coordinated MIMO operation with respect to a serving eNB and one or more coordinated eNBs. In other words, the scheduler may directly command each eNB to perform a coordinated MIMO operation.

As described above, the CoMP system may be considered a virtual MIMO system by grouping a plurality of neighboring cells into one and a communication scheme of a MIMO system using multiple antennas may be basically applied thereto. Operation of the MIMO system will be described in detail later.

Figure 2:
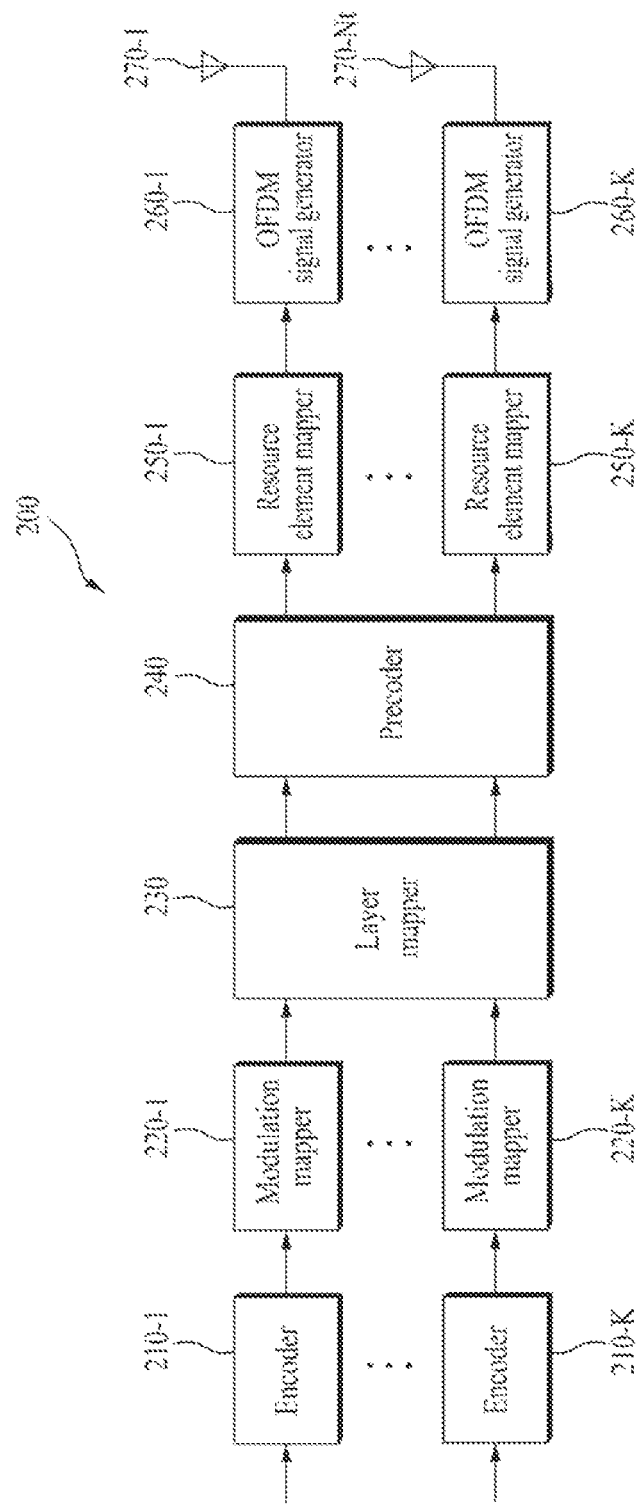
FIG. 2 is a block diagram illustrating the structure of a transmitter including multiple antennas.

FIG. 2 is a block diagram illustrating the structure of a transmitter including multiple antennas.

Referring to FIG. 2, a transmitter 200 includes encoders 210-1, ..., 210-K, modulation mappers 220-1, ..., 220-K, a layer mapper 230, a precoder 240, resource element mappers 250-1, ..., 250-K, and OFDM signal generators 260-1, ..., 260K. The transmitter 200 further includes Nt transmit antennas 270-1, ..., 270-Nt.

The encoders 210-1, ..., 210-K form coded data by encoding input data according to a predetermined coding scheme. The modulation mappers 220-1, ..., 220-K map the coded data to modulation symbols indicating locations on a signal constellation. The modulation scheme may be, but not limited to, any of m-Phase Shift Keying (m-PSK) and m-Quadrature Amplitude Modulation (m-QAM). The m-PSK may be BPSK, QPSK, or 8-PSK for example. The m-QAM may be 16-QAM, 64-QAM, or 256-QAM.

The layer mapper 230 defines the layers of the modulation symbols so that the precoder 240 can distribute antenna-specific symbols to paths of the respective antennas. A layer is defined as an information path input to the precoder 240. An information path prior to the precoder 240 may be called a virtual antenna or layer.

The precoder 240 processes the modulation symbols by a MIMO scheme according to the multiple transmit antennas 270-1, ..., 270-Nt and outputs the antenna-specific symbols. The precoder 240 distributes the antenna-specific symbols to the resource element mappers 250-1, ..., 250-K of corresponding antenna paths. Each information path transmitted to one antenna by the precoder 240 is called a stream. The stream may also be called a physical antenna.

The resource element mappers 250-1, ..., 250-K allocate the antenna-specific symbols to proper resource elements and multiplex the antenna-specific symbols according to users. The OFDM signal generators 260-1, ..., 260-K modulate the antenna-specific symbols according to an OFDM scheme and generate OFDM symbols. The OFDM signal generators 260-1, ..., 260-K may perform Inverse Fast Fourier Transform (IFFT) upon the antenna-specific symbols. A Cyclic Prefix (CP) may be inserted into time domain symbols upon which IFFT has been performed. The CP is a signal inserted to a guard interval in order to eliminate inter-symbol interference caused by multiple paths in an OFDM transmission scheme. The OFDM symbols are transmitted through the respective transmit antennas 270-1, ..., 270-Nt.

The structure of a radio frame will now be described with reference to FIG. 3 and FIG. 4.

In a cellular OFDM radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

Figure 3:
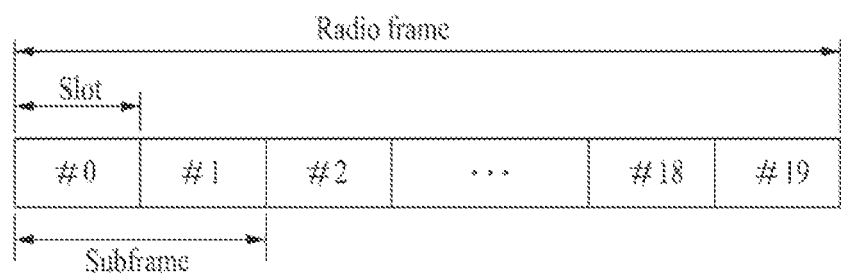
FIG. 3 is a diagram illustrating the structure of a Type 1 radio frame.

FIG. 3 is a diagram illustrating the structure of the type 1 radio frame. A downlink radio frame includes 10 subframes, and one subframe includes two slots. A time required to transmit one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain.

The number of OFDM symbols included in one slot may be changed according to the configuration of a CP. The CP includes an extended CP and a normal CP. For example, if the OFDM symbols are configured by the normal CP, the number of OFDM symbols included in one slot may be seven. If the OFDM symbols are configured by the extended CP, since the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a UE moves at a high speed, the extended CP may be used in order to further reduce inter-symbol interference.

In case of using the normal CP, since one slot includes 7 OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

Figure 4:
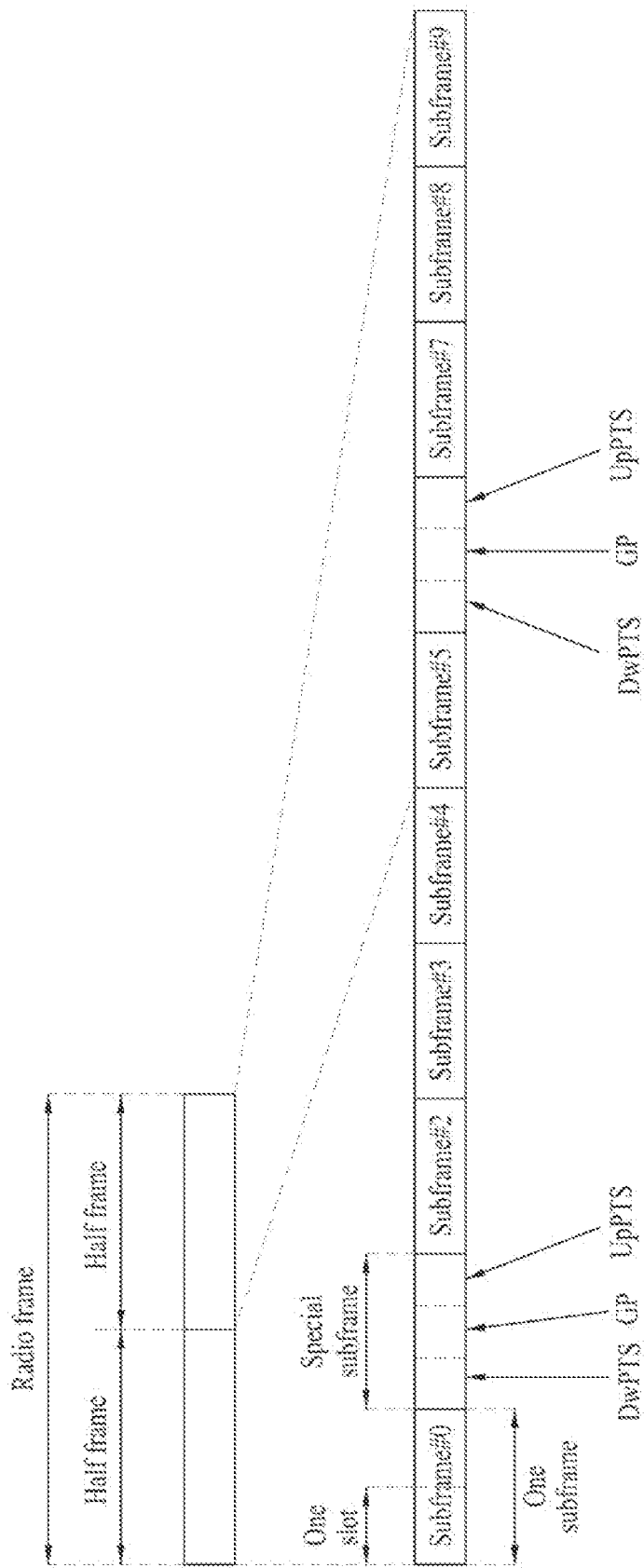
FIG. 4 is a diagram illustrating the structure of a Type 2 radio frame.

FIG. 4 is a diagram illustrating the structure of the type 2 radio frame. The type 2 radio frame includes two half frames, each of which includes five subframes. The subframes may be classified into general subframes and special subframes. The special subframe includes three fields of a Downlink Pilot Time Slot (DwPTS), a Guard Period (GP), and an Uplink Pilot Time Slot (UpPTS). Although the lengths of these three fields may be individually configured, a total length of the three fields should be 1 ms. One subframe includes two slots. In other words, one subframe includes two slots regardless of a type of the radio frame.

The structure of the radio frame is only exemplary. Accordingly, the number of subframes included in the radio frame, the number of slots included in the subframe, or the number of symbols included in the slot may be changed in various manners.

Figure 5:
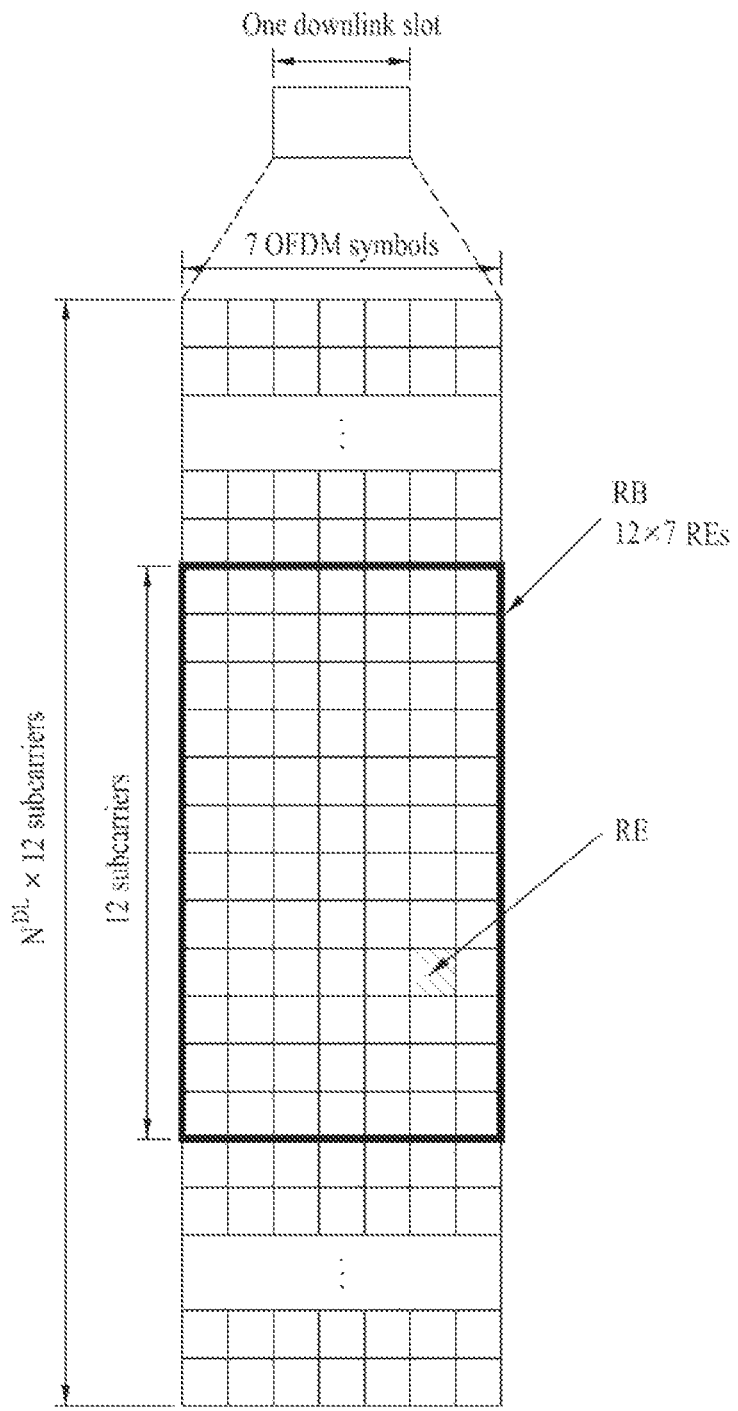
FIG. 5 is a diagram illustrating an exemplary resource grid for one downlink slot.

FIG. 5 is a diagram illustrating an exemplary resource grid for one downlink slot. In FIG. 5, OFDM symbols are configured by a normal CP. Referring to FIG. 5, a downlink slot includes a plurality of OFDM symbols in the time domain and a plurality of RBs in the frequency domain. Although one downlink slot includes 7 OFDM symbols and one RB includes 12 subcarriers in the figure, the numbers of OFDM symbols and subcarriers are not limited thereto. Each element on the resource grid is referred to as a Resource Element (RE). For example, an RE a(k,l) denotes an RE located in a k-th subcarrier and an I-th OFDM symbol. In case of a normal CP, one RB includes 12×7 REs (in case of an extended CP, one RB includes 12×6 REs). Since each subcarrier spacing is 15 kHz, one RB includes about 180 kHz in the frequency domain. $N^{DL}$ denotes the number of RBs included in the downlink slot. A value of $N^{DL}$ may be determined based on a downlink transmission bandwidth which is configured by scheduling of an eNB.

Figure 6:
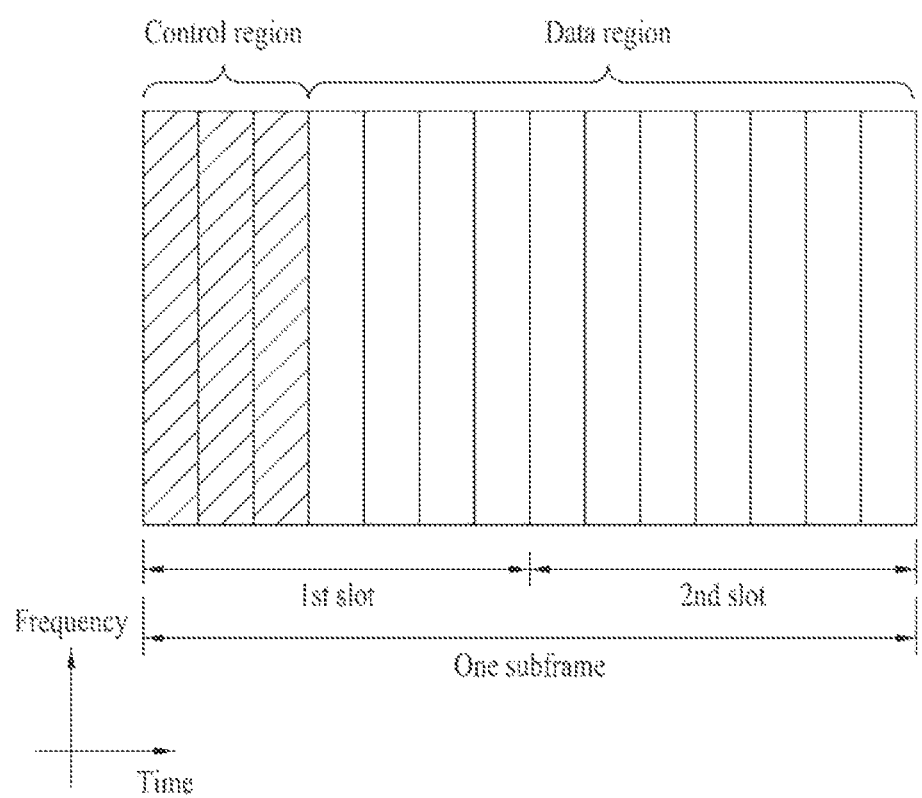
FIG. 6 is a diagram illustrating the structure of a downlink subframe.

FIG. 6 is a diagram illustrating the structure of a downlink subframe. A maximum of three OFDM symbols (one, two, or three OFDM symbols) of a front portion of a first slot within one subframe corresponds to a control region to which a control channel is allocated. The remaining OFDM symbols correspond to a data region to which a Physical Downlink Shared Channel (PDSCH) is allocated. A basic transmission unit is one subframe. Namely, a PDCCH and a PDSCH are allocated over two slots. Examples of the downlink control channels used in the 3GPP LTE system include a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a random access response transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive Control Channel Elements (CCEs). The CCE is a logical allocation unit used to provide the PDCCHs at a coding rate based on the state of a radio channel. The CCE corresponds to a plurality of RE groups. The format of the PDCCH and the number of available bits are determined based on a correlation between the number of CCEs and a coding rate provided by the CCEs. An eNB determines a PDCCH format according to DCI transmitted to a UE, and attaches a Cyclic Redundancy Check (CRC) to control information. The CRC is masked with an identifier called a Radio Network Temporary Identifier (RNTI) according to an owner or usage of the PDCCH. If the PDCCH is for a specific UE, a Cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a System Information Block (SIB)), a system information identifier and a System Information RNTI (SI-RNTI) may be masked to the CRC. To indicate a random access response that is a response for transmission of a random access preamble of a UE, a Random Access-RNTI (RA-RNTI) may be masked to the CRC.

Figure 7:
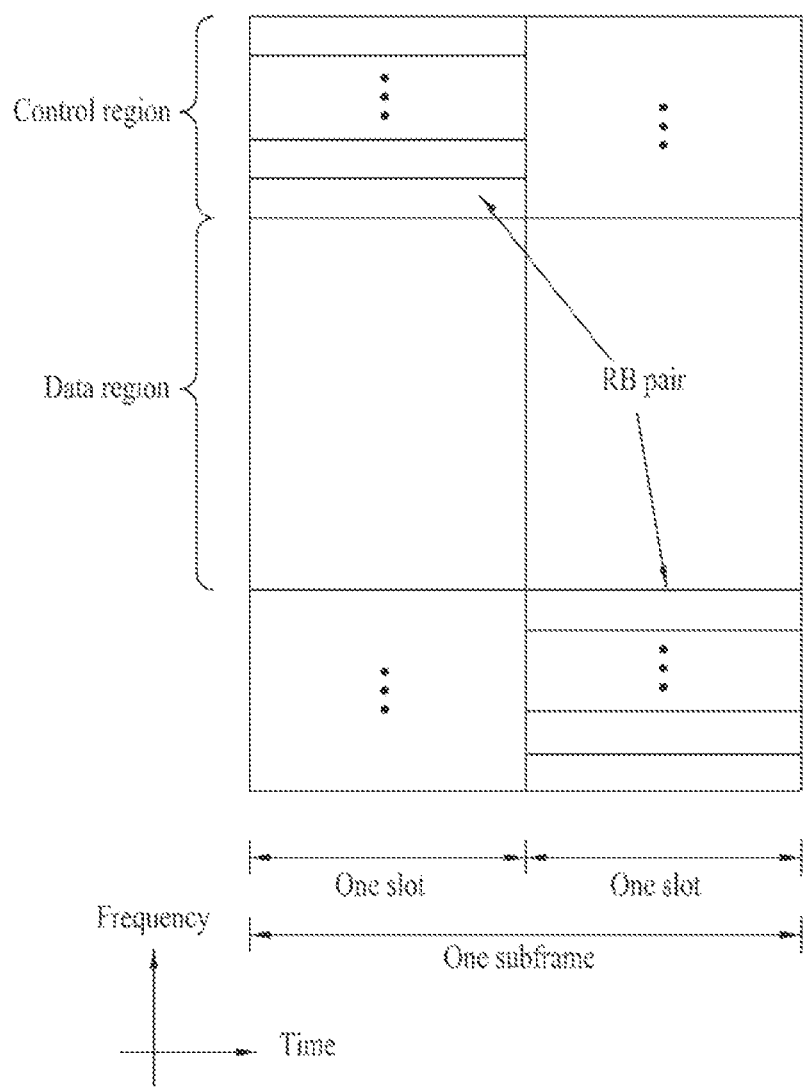
FIG. 7 is a diagram illustrating the structure of an uplink subframe.

FIG. 7 is a diagram illustrating the structure of an uplink frame. The uplink subframe may be divided into a control region and a data region in the frequency domain. A Physical Uplink Control Channel (PUCCH) including uplink control information is allocated to the control region. A Physical Uplink Shared Channel (PUSCH) including user data is allocated to the data region. The PUCCH is used for three broadly divided purposes: ACK/NACK transmission for the PDSCH, Channel Quality Indicator (CQI) transmission for frequency domain scheduling of the PDSCH, and PUSCH transmission resource request (scheduling request). A CQI information bit may include one or more fields. For example, a CQI field indicating a CQI index for determining a Modulation and Coding Scheme (MCS), a Precoding Matrix Indicator (PMI) field indicating a precoding matrix index in a codebook, and a Rank Indicator (RI) field indicating a rank may be included in the CQI information bit.

To maintain single carrier property, one UE does not simultaneously transmit the PUCCH and the PUSCH. The PUCCH for one UE is allocated to an RB pair in a subframe. RBs belonging to the RB pair occupy different subcarriers over two slots. This is considered that the RB pair allocated to the PUCCH is frequency-hopped at a slot boundary.

MIMO System

FIG. 8 illustrates the configuration of a radio communication system having multiple antennas. As shown in FIG. 8(a), if the number of transmit antennas is increased to $N_T$ and the number of receive antennas is increased to $N_R$, a theoretical channel transmission capacity is increased in proportion to the number of antennas, unlike the case where a plurality of antennas is used in either a transmitter or a receiver. Accordingly, it is possible to improve transmission rate and to remarkably improve frequency efficiency. As the channel transmission capacity is increased, the transmission rate may be theoretically increased by a product of a maximum transmission rate $R_0$ upon using a single antenna and a rate increase ratio $R_i$.

$$R_i = \min(N_T, N_R) \qquad \text{Equation 1}$$

For example, in a MIMO system using four transmit antennas and four receive antennas, it is possible to theoretically acquire a transmission rate which is four times that of a single antenna system. After the increase in the theoretical capacity of the MIMO system was proven in the mid-1990s, various technologies for substantially improving data transmission rate have been actively developed up to now. In addition, several technologies have already been applied to the various radio communication standards such as the third-generation mobile communication and the next-generation wireless local area network (LAN).

According to research trends in MIMO up to now, research has been actively conducted in various aspects, such as research into information theory related to MIMO communication capacity calculation in various channel environments and multiple access environments, research into radio channel measurement and model derivation of the MIMO system, and research into space-time signal processing technologies for improving transmission reliability and transmission rate.

The communication method of the MIMO system will be described in more detail using mathematical modeling. In the above system, it is assumed that $N_T$ transmit antennas and $N_R$ receive antennas are present.

In transmission signals, if $N_T$ transmit antennas are present, the number of pieces of maximally transmittable information is $N_T$. The transmission information may be expressed as follows.

$$s = [s_1, s_2, \ldots, s_{N_T}]^T \qquad \text{Equation 2}$$

The transmission information $s_1, s_2, \ldots, s_{N_T}$ may have different transmit powers. If the respective transmit powers are $P_1, P_2, \ldots, P_{N_T}$, the transmission information with adjusted powers may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{Equation 3}$$

In addition, ŝ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

Consider that the $N_T$ actually transmitted signals $x_1, x_2, \ldots, x_{N_T}$ are configured by applying a weight matrix W to the information vector ŝ with the adjusted transmit powers. The weight matrix W serves to appropriately distribute the transmission information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} \quad \text{Equation 5}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

where, $w_{ij}$ denotes a weight between an i-th transmit antenna and j-th information. W is also called a precoding matrix.

If the $N_R$ receive antennas are present, respective reception signals $y_1, y_2, \ldots, y_{N_R}$ of the antennas are expressed as follows.

$$y = [y_1, y_2, \ldots, y_{N_R}]^T \quad \text{Equation 6}$$

If channels are modeled in the MIMO radio communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 8(b) illustrates channels from the $N_T$ transmit antennas to the receive antenna i. The channels may be combined and expressed in the form of a vector and a matrix. In FIG. 8(b), the channels from the $N_T$ transmit antennas to the receive antenna i may be expressed as follows.

$$h_i^T = [h_{i1}, h_{i2}, \ldots, h_{iN_T}] \quad \text{Equation 7}$$

Accordingly, all the channels from the $N_T$ transmit antennas to the $N_R$ receive antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{Equation 8}$$

Additive White Gaussian Noise (AWGN) is added to the actual channels after a channel matrix H. The AWGN $n_1, n_2, \ldots, n_{N_R}$ added to the $N_T$ transmit antennas may be expressed as follows.

$$n = [n_1, n_2, \ldots, n_{N_R}]^T \quad \text{Equation 9}$$

Through the above-described mathematical modeling, the reception signals may be expressed as follows.

$$y = \begin{bmatrix} y_1 \\ y_2 \\ \vdots \\ y_i \\ \vdots \\ y_{N_R} \end{bmatrix} \quad \text{Equation 10}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The numbers of rows and columns of the channel matrix H indicating the channel state are determined by the number of transmit and receive antennas. The number of rows of the channel matrix H is equal to the number $N_R$ of receive antennas and the number of columns thereof is equal to the number $N_T$ of transmit antennas. That is, the channel matrix H is an $N_R \times N_T$ matrix.

The rank of the matrix is defined by the smaller of the numbers of rows and columns which are independent of each other. Accordingly, the rank of the matrix is not greater than the number of rows or columns. The rank rank(H) of the channel matrix H is restricted as follows.

$$\text{rank}(H) \leq \min(N_T, N_R) \quad \text{Equation 11}$$

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

In a description of the present document, a 'rank' for MIMO transmission refers to the number of paths which can independently transmit signals in a specific time point and a specific frequency resource, and 'the number of layers' refers to the number of signal streams transmitted to the respective paths. Generally, since a transmitting end transmits layers corresponding in number to ranks used for signal transmission, rank has the same meaning as the number of layers unless particularly mentioned.

In a MIMO system, there are various MIMO transmission schemes (transmission modes). A multiple antenna transmission and reception scheme used for operation of the MIMO system may include Frequency Switched Transmit Diversity (FSTD), Space Frequency Block Code (SFBC), Space Time Block Code (STBC), Cyclic Delay Diversity (CDD), Time Switched Transmit Diversity (TSTD), etc. In case of a rank 2 or higher ranks, Spatial Multiplexing (SM), Generalized Cyclic Delay Diversity (GCDD), Selective Virtual Antenna Permutation (S-VAP), etc. may be used.

FSTD is a scheme for allocating subcarriers of different frequencies to signals transmitted through multiple antennas to obtain a diversity gain. SFBC is a scheme for efficiently applying selectivity in the space domain and frequency domain to ensure both a diversity gain in a corresponding dimension and a multi-user scheduling gain. STBC is a scheme for applying selectivity in the space domain and time domain. CDD is a scheme using a path delay between transmit antennas to obtain a diversity gain. TSTD is a scheme in which signals transmitted to multiple antennas are divided based on time. SM is a scheme for transmitting different data to each antenna to improve transmission rate. GCDD is a scheme for applying selectivity in the time domain and frequency domain. S-VAP is a scheme using a single precoding matrix, and includes a Multi-Codeword (MCW) S-VAP for mixing multiple codewords to antennas in spatial diversity or spatial multiplexing and a Single Codeword (SCW) S-VAP using a single codeword.

According to the aforementioned various MIMO transmission schemes (MIMO transmission modes), various types of scheduling signaling (PDCCH DCI formats) may be used. In other words, scheduling signaling may have various MIMO transmission modes in different forms, and a UE may determine a MIMO transmission mode according to the scheduling signaling.

Meanwhile, in the MIMO system, there are an open-loop scheme in which feedback information from a receiving end is not used and a closed-loop scheme in which feedback information from the receiving end is used. The closed-loop scheme causes the receiving end to transmit feedback information about a channel state to the transmitting end and thus causes the transmitting end to recognize the channel state, thereby improving the performance of a radio communication system. The closed-loop MIMO system uses a precoding scheme in which the transmitting end processes transmission data using feedback information about a channel environment transmitted from the receiving end to minimize the influence of a channel.

The precoding scheme includes a codebook based precoding scheme and a precoding scheme for quantizing channel information and then feeding back the quantized channel information.

Figure 9:
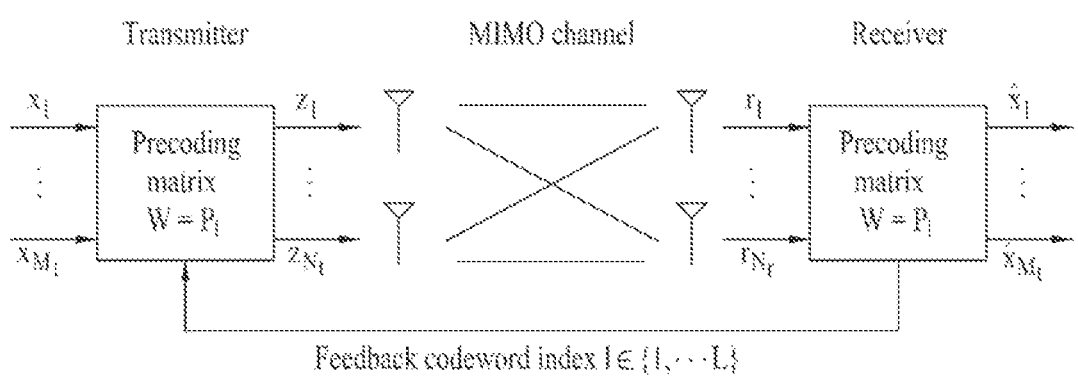
FIG. 9 is a diagram explaining a basic concept of codebook based precoding.

In relation to the aforementioned MIMO transmission technique, the codebook based precoding scheme is described. FIG. 9 is a diagram explaining a basic concept of codebook based precoding.

In accordance with the codebook based precoding scheme, a transmitter and a receiver share codebook information including a predetermined number of precoding matrices according to a transmission rank, the number of antennas, etc. The receiver may measure a channel state through a received signal to feed back preferred precoding matrix information (preceding matrix index) based on the codebook information to the transmitter. In FIG. 9, the receiver transmits preferred precoding matrix information to the transmitter with respect to each codeword but the preferred precoding matrix information is not limited thereto.

The transmitter receiving the feedback information from the receiver may select a precoding matrix from a codebook based on the received information. The transmitter selecting the preceding matrix performs precoding by multiplying the selected precoding matrix by layer signals corresponding in number to a transmission rank and may transmit the preceded transmission signals through a plurality of antennas. The receiver receiving the transmission signals precoded by the transmitter may perform inverse processing of preceding which has performed by the transmitter to restore reception signals. Generally, the precoding matrix satisfies a unitary matrix (U) condition such as $U*U^H = I$. The aforementioned inverse processing of precoding may be performed by multiplying a Hermit matrix $P^H$ of the precoding matrix P used for precoding of the transmitter by the reception signals.

Thus, since only a codebook based index is fed back to the transmitter, system overhead can be greatly reduced compared with feeding back all channel information.

Using the above codebook based precoding scheme, a scheme in which a receiver (UE) feeds back channel information to a transmitter (BS) in a multi-cell environment may be applied even to a CoMP system.

More specifically, for effective operation of the CoMP system, it is necessary to feed back, from the UE to the BS, information such as a Precoding Matrix Index (PMI) of a virtual multi-antenna channel formed between coordinated BSs and UEs belonging to a coordinated group, Signal-to-Noise Ratio (SNR) (or Signal-to-Interference plus Noise Ratio (SINR)) of each stream, and the number of transmittable independent data (i.e. rank information).

As a feedback scheme of a UE for channel information necessary for a CoMP operation, an extended scheme of a channel information feedback scheme used in conventional single-cell MIMO communication may be considered. In other words, a UE may quantize channel information of a coordinated BS using a single codebook which fixedly uses a PMI of a channel of one BS, an SNR, the number of bits for indicating a rank and then may feed back the quantized channel information to the BS.

For example, if the UE feeds back an SNR and inter-cell interference information to the BS, neighboring BSs may determine a coordinated unit and a coordinated communication scheme using the feedback information and may transmit the result to the UE. The UE quantizes channel information of a coordinated BS using a single codebook which fixedly uses a PMI of a channel of one BS, an SNR, the number of bits for indicating rank and, if necessary, further quantizes phase difference information of a channel of each BS to feed back the quantized information to the BS. Then the BS may perform inter-cell coordinated communication using the information fed back by the UE.

Meanwhile, in order for a scheduler of a BS to select a proper one of various coordinated transmission schemes, it is necessary to consider distribution of users (UEs) and the number of bits of a feedback quantized channel.

To determine an efficient coordinated transmission scheme, feedback using a single level codebook from the UE may be considered. According to this scheme, under the circumstance that the BS and the UE share the same codebook of a single level, the BS may transmit a reference signal or a pilot signal, and the UE may estimate a channel using the reference signal, quantize channel information about a selected sub-band, and feed back the quantized channel information using a quantized bit of a single level to the BS. The BS may perform coordinated transmission mode determination and user scheduling using the feedback information and transmit the data to a selected user. The UE may then transmit ACK/NACK information about data transmission from the BS.

Mode Switching Method Between CoMP Communication Mode and a Single-Cell MIMO Communication Mode As described previously, the multi-cell CoMP communication scheme can be divided into a JP scheme and a CBF scheme, and the JP scheme includes JT and CSL. Meanwhile, the single-cell MIMO scheme can be divided into an SU-MIMO scheme and an MU-MIMO scheme.

Since a multi-cell CoMP operation may be regarded operation of a virtual MIMO system by grouping a plurality of spatially separated BSs (or cells) into one, a communication scheme of the multi-cell CoMP operation has a close relationship with a communication scheme of a single-cell MIMO operation. In consideration of this, the present invention proposes a method for mode switching between a multi-cell CoMP communication mode and a single-cell MIMO communication mode. More specifically, proper communication schemes to which dynamic mode switching is applicable (i.e. having a corresponding relationship) between a multi-cell CoMP communication mode and a single-cell MIMO communication mode will be discussed, and methods for dynamic switching between the communication schemes having the corresponding relationship, and detailed proposal matters for supporting the dynamic switching methods will be described.

CoMP Communication Scheme and Single-Cell MIMO Communication Scheme Having a Corresponding Relationship The CoMP communication scheme and the single-cell MIMO communication scheme may have a corresponding relationship with each other based on rank. Here, rank refers to the number of data layers which are simultaneously transmitted to one UE in a specific time point and a specific frequency resource.

As an example, JT of the CoMP communication scheme and SU-MIMO of the single-cell MIMO communication scheme have something in common in that the both schemes generally perform transmission of a high rank. More specifically, in case of the CoMP JT scheme, two or more cells participate in transmission for one UE and, therefore, there is a high probability of high rank transmission. In case of the single-cell SU-MIMO scheme, one UE utilizes all spatial resources of one cell and, therefore, there is a high probability of high rank transmission. Accordingly, the corresponding relationship between the CoMP JT scheme and the single-cell SU-MIMO scheme may be considered based on a common point of high rank transmission.

Since the CoMP JT scheme and the single-cell SU-MIMO scheme have a similar characteristic in that a UE receives high rank transmission, the two communication schemes have the corresponding relationship with each other and thus dynamic switching can be easily performed. Here, dynamic switching refers to switching from one mode to another mode without additional signaling from a BS. In other words, during switching from the CoMP JT scheme to the single-cell SU-MIMO scheme or from the single-cell SU-MIMO scheme to the CoMP JT scheme, additional signaling may not be needed. In the CoMP JT scheme, dynamic switching to the single-cell SU-MIMO scheme may be expressed as fallback without additional signaling from the CoMP JT scheme to the single-cell SU-MIMO scheme. Namely, fallback from the CoMP JT scheme to the single-cell SU-MIMO scheme refers to signal transmission to an associated UE only in one cell and stop of signal transmission to an associated UE in the other cells, while transmitting signals to one UE in two or more cells according to the CoMP JT scheme. Such fallback may be regarded operation according to the single-cell SU-MIMO scheme.

When multiple cells participate in CoMP JP, it is possible to perform dynamic switching between CoMP JT schemes having different transmission cells. For example, with respect to a UE located at a common boundary of cells A, B, and C, dynamic switching may be performed such that communication of the CoMP JT scheme is performed in the cells A and B at any time point and communication of the CoMP JT scheme is performed in the cells A and C at another time point.

As another example, since CBF of the CoMP communication scheme and MU-MIMO of the single-cell MIMO communication scheme have something in common in that the both schemes generally perform transmission of a low rank, the corresponding relationship of these two communication scheme may be considered. More specifically, in case of the CoMP CBF scheme, since signals for one UE are transmitted from only one BS and a CoMP operation is mainly performed with respect to a UE at a cell boundary, it is generally difficult to use high rank. In addition, in the CBF scheme, a cooperative cell should determine a beam direction which is not used by a target UE of the CoMP operation. However, if a signal of a high rank is transmitted to the corresponding UE, options for selection of a beam direction which can be used in a cooperative cell may become narrow. Accordingly, the CoMP CBF scheme generally performs transmission of a low rank. In case of the single-cell MU-MIMO scheme, since two or more UEs receive signals by sharing spatial resources of one cell, a rank of each UE is generally set to have a low value.

Since the CoMP CBF scheme and the single-cell MU-MIMO scheme have similar characteristics in that a UE receives low rank transmission, the two communication schemes have a corresponding relationship with each other and thus dynamic switching can be easily performed therebetween. In other words, during switching from the CoMP CBF scheme to the single-cell MU-MIMO scheme or from the single-cell MU-MIMO scheme to the CoMP CBF scheme, additional signaling may not be needed. In the CoMP CBF scheme, dynamic switching to the single-cell MU-MIMO scheme may be expressed as fallback without additional signaling from the CoMP CBF scheme to the single-cell MU-MIMO scheme. Namely, fallback from the CoMP CBF scheme to the single-cell MU-MIMO scheme means that, for example, during MIMO transmission to the plurality of UEs in a cell A, operation (i.e. operation of the CoMP CBF scheme) is performed by cooperation with a cell B such that a beam of the cell B is not formed in the direction of the plurality of UEs receiving signals from the cell, and thereafter, the cell A alone performs MIMO transmission to the plurality of UEs without beamforming cooperation of the cell B. Such fallback may be regarded operation in the single-cell MU-MIMO scheme.

As still another example, CSL of the CoMP communication scheme may have a corresponding relationship with CoMP JT of the CoMP JP scheme to dynamically perform switching between these communication schemes.

In addition, switching between one of the CoMP JT scheme and the single-cell SU-MIMO scheme and one of the CoMP CBF scheme and the single-cell MU-MIMO scheme may also be dynamically performed.

Figure 10:
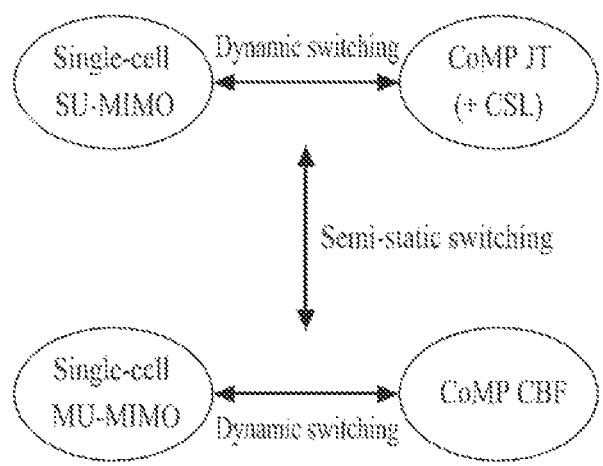
FIG. 10 is a diagram conceptually explaining a corresponding relationship and switching operation between a CoMP communication scheme and a single-cell MIMO communication scheme.

Switching between the CoMP communication scheme and the single-cell MIMO communication scheme, which have been described, may be illustrated as in FIG. 10.

Meanwhile, it is proposed that switching between the CoMP communication scheme and the single-cell MIMO communication scheme, except for the corresponding relationship between the CoMP JT scheme and the single-cell SU-MIMO scheme and the corresponding relationship between the CoMP CBF scheme and the single-cell MU-MIMO scheme, be non-dynamically performed. In other words, switching between the CoMP scheme and the single-cell MIMO communication scheme except for the corresponding relationship between the above-described CoMP scheme and single-cell MIMO communication scheme may be performed through a higher layer signal (e.g. through RRC signaling). For instance, when switching to the CoMP CBF scheme or the single-cell MU-MIMO scheme from the CoMP JT scheme or the single-cell SU-MIMO scheme is performed, a higher layer signal indicating such switching is transmitted to a UE from a BS, and the UE may be semi-statically operated according to any one of the two schemes by a corresponding signal.

As described above, it is possible to dynamically switch between the CoMP communication scheme and the single-cell MIMO communication scheme without additional signaling. To support this, it may be considered to have common characteristics in CQI transmission and feedback codebook use in the CoMP communication scheme and single-cell MIMO communication scheme having the corresponding relationship.

CQI Transmission

In the above-described communication schemes having a corresponding relationship, it is proposed to apply the same hypothesis when a UE calculates a CQI and/or an RI. Applying the same hypothesis means that the same configuration and method are applied when the CQI and/or the RI are calculated and transmitted. Dynamic switching between the CoMP communication scheme and the single-cell MIMO communication scheme can be easily performed by calculating the CQI and/or RI according to the same hypothesis.

Hypothesis about CQI and RI calculation may include periodic/aperiodic transmission, a transmission period in case of periodic transmission, a frequency band for CQI calculation, a MIMO transmission scheme, and a relationship between the CQI and the RI, and the same hypothesis about these factors may be applied to the communication schemes having a corresponding relationship. More specifically, the CQI is calculated based on channel quality such as a Signal-to-Noise Ratio (SNR) and may provide information about a link adaptive parameter which can be supported by a UE at a given time. The CQI may be calculated by a wideband feedback scheme in which one CQI value for an entire system band is fed back, a UE-selected subband feedback scheme in which a UE estimates channel quality of each subband, selects a plurality of subbands having good quality, and feeds back an average CQI value for the selected subbands, and a higher layer configured subband feedback scheme in which an individual CQI for each subband configured in a higher layer is fed back. The RI may indicate information about the number of layers recommended by a UE. In other words, the RI may indicate the number of streams used for spatial multiplexing. The RI can be fed back only when a UE operates in a MIMO mode using spatial multiplexing. For example, the RI is not fed back in a single antenna port mode or a transmit diversity mode. The RI is always associated with more than one CQI feedback. Namely, a CQI which is fed back is calculated under the assumption of a specific RI value. Generally, since a channel rank varies slower than the CQI, the number of RIs less than the number of CQIs may be fed back. For example, the transmission period of the RI may be twice the transmission period of the CQI/PMI. The RI is given for an entire system band, and frequency selected RI feedback is not supported. The transmission of uplink control information includes periodic transmission and aperiodic transmission. Although the periodic transmission is usually performed through a PUCCH, it may be performed through a PUSCH. The aperiodic transmission is performed by requesting a UE when a BS needs more accurate channel state information. The aperiodic transmission is performed through a PUSCH. The use of the PUSCH enables large capacity and precise channel state reporting. If the periodic transmission and aperiodic transmission collide, only the aperiodic transmission is performed.

When a BS transmits signals to a UE by determining an MCS etc. according to the feedback CQI, different CQI feedback methods may be applied according to the characteristics of a communication scheme. For example, in the CoMP JT scheme or the single-cell SU-MIMO scheme, since signals are transmitted to one UE from a cell or cells, a difference between channel quality measured and then fed back by the UE and actually transmitted channel quality may be insignificant. However, in the CoMP CBF scheme or the single-cell MU-MIMO scheme, since signals are transmitted to a plurality of UEs from a cell or cells and channel quality measured by one UE may be influenced by a channel to another UE, there occurs a difference between channel information measured and then fed back by the UE and actually transmitted channel quality. In this case, even though the BS determines an MCS etc. of a transmission signal based on the feedback CQI, a new scheme for feeding back channel quality correction information again to a cell or cells may be considered in consideration of channel quality during actual signal transmission.

Alternatively, a scheme for a UE to previously inform a cell of channel quality correction information about single-cell MU-MIMO may be considered. More specifically, when any UE feeds back a CQI in single-cell SU-MIMO to a cell, the UE may feed back correction information indicating how a CQI in MU-MIMO (i.e. considering other UEs) is changed compared with the CQI in single-cell SU-MIMO, under the assumption that the UE operates according to a single-cell MU-MIMO scheme as a pair with another UE using specific precoding information. Similarly, the UE may provide a CQI in the CoMP CBF scheme or the single-cell MU-MIMO scheme to cells as correction information based on a CQI in the CoMP JT scheme or the single-cell SU-MIMO scheme.

Considering this, a conventional CQI calculation and transmission method (i.e. a first hypothesis of CQI calculation) may be applied to the CoMP JT scheme and the single-cell SU-MIMO scheme and a new CQI calculation and transmission method (i.e. a second hypothesis of CQI calculation) may be applied to the CoMP CBF scheme and the single-cell MU-MIMO scheme.

The UE transmits the CQI and/or RI based on the same hypothesis about considerations in transmitting the CQI and/or RI in the CoMP communication scheme and single-cell MIMO communication scheme having the corresponding relationship, thereby easily performing dynamic switching between the CoMP communication scheme and the single-cell MIMO communication scheme.

Feedback Codebook

To support dynamic switching according to the corresponding relationship of the CoMP communication scheme and the single-cell MIMO communication scheme, it is proposed to use the same feedback codebook in the communication schemes having a mutual corresponding relationship. Dynamic switching between the CoMP communication scheme and the single-cell MIMO communication scheme can be easily performed by using the same feedback codebook. Using the same codebook means defining one codebook rather than defining separate codebooks according to different communication schemes, and one codebook may have codebook scalability which will be described later.

Here, it is assumed that multi-cell channel information feedback for a CoMP operation is configured by a combination of channel information feedback for an individual coordinated cell. Then a UE performing feedback for a CoMP operation may feed back channel information of each CoMP coordinated cell using a feedback codebook of a single-cell MIMO communication scheme corresponding to (having a corresponding relationship) an associated CoMP communication scheme which is semi-statically configured.

To support this, two different codebooks are defined. It is proposed that one of the tow codebooks be used in the CoMP JT scheme and the single-cell SU-MIMO scheme, and the other be used in the CoMP CBF scheme and the single-cell MU-MIMO scheme.

For the CoMP JT scheme and the single-cell SU-MIMO scheme, a feedback codebook optimized for a high rank may be used. In these communication schemes, since one UE receives signals of multiple layers, it is difficult to correctly receive the multiple layer signals when a signal for one layer functions as interference with other layers. Accordingly, it is necessary to maintain orthogonality between a plurality of layers and thus a codebook including unitary matrices (columns of which have orthogonality) may be used. It may be assumed in a UE that a BS distinguishes between different layers using precoding vectors having orthogonality. As an example of such a codebook, a feedback codebook defined in 3GPP LTE release-8 or an extended codebook thereof may be used.

In the single-cell SU-MIMO scheme, feedback may be performed based on a codebook-based transmission precoding hypothesis (hypothesis using LTE release-8 codebook or an extended codebook thereof) for a serving cell. In the CoMP JP (or CoMP JT) scheme, feedback may be performed based on a transmission precoding hypothesis about a serving cell and coordinated cells and relative phase information between transmit PMIS (TPMIs) while a feedback codebook used in the SU-MIMO scheme or an extended codebook thereof is used.

Meanwhile, in the CoMP CBF scheme and the single-cell MU-MIMO scheme, a feedback codebook optimized for a low rank may be used. In this case, it is important to transfer accurate channel information. However, since a precoding vector applied to each layer does not need to have orthogonality (considering that other layer signals are signals for other users), it is unnecessary for a codebook to be configured by unitary matrices. By configuration of a codebook of non-unitary matrices, the codebook can be designed such that more accurate channel information can be transferred. In addition, it is not assumed in the UE that the BS distinguishes different layers using precoding vectors having orthogonality.

In the single-cell MU-MIMO scheme, feedback may be performed based on a quantized channel or quantized effective channel for a serving cell, and thus a reception process etc. may be used. In the CoMP CBF scheme, feedback may be performed based on a quantized channel or quantized effective channel for a serving cell and coordinated cells.

In the CoMP CBF scheme, a feedback codebook may include a non-unitary matrix when it is expressed in a matrix form, and may include vectors not demanding orthogonality when it is expressed in a column vector form.

In the CoMP CBF scheme and the single-cell MU-MIMO scheme, a feedback codebook having higher granularity than a feedback codebook used in the CoMP JT scheme and the single-cell SU-MIMO scheme may be used to transfer more accurate channel information. For example, the size of a feedback codebook may be increased (i.e. a channel state can be fed back using more bits) or a hierarchical codebook or adaptive codebook technique may be applied. The hierarchical codebook technique means raising feedback accuracy using different feedback codebooks (including multiple-resolution codebooks having different resolution) every feedback time point. The adaptive codebook technique means using a feedback codebook obtained through modification such as multiplying a long-term channel covariance matrix by a given basic feedback codebook.

Codebook Scalability

Codebook scalability means that a subset of a codebook used in one of different communication schemes can configure a codebook of another communication scheme while the same codebook is basically used between different communication schemes. For example, while the same codebook is defined and used in the single-cell MIMO communication scheme and the CoMP communication scheme, a codebook in the single-cell MIMO communication scheme may be configured as a subset of a codebook used in the CoMP communication scheme.

According to the present invention, code scalability is applied to the CoMP communication scheme and single-cell MIMO communication scheme having a mutual corresponding relationship and facilitates dynamic switching therebetween.

More specifically, in the CoMP JP scheme, a precoding codebook may reuse a single-cell SU-MIMO precoding codebook (e.g. codebook defined in LTE release-8) to apply precoding for an antenna port of each cell. Further, in the CoMP JP scheme, potentially different phase adjustment values may be applied to each cell.

A precoding codebook in the single-cell MU-MIMO scheme and a feedback codebook in the CoMP CBF scheme may have scalability. For example, the single-cell MU-MIMO feedback codebook and the CoMP CBF feedback codebook may be the same codebook, or the single-cell MU-MIMO precoding codebook may be a subset of the CoMP CBF feedback codebook. Here, the feedback codebook used in the CoMP CBF scheme may be a codebook including non-unitary matrices. In the CoMP CBF scheme, when a plurality of vectors is fed back by a UE (e.g. feedback for a high rank or feedback for both a serving cell and coordinated cells), the plurality of vectors does not need to have orthogonality.

Meanwhile, a precoding codebook in the single-cell SU-MIMO scheme and a feedback codebook in the CoMP CBF scheme may have scalability although the CoMP communication scheme and single-cell MIMO communication scheme do not have a mutual corresponding relationship. In other words, the single-cell SU-MIMO precoding codebook may be a subset of the CoMP CBF feedback codebook. More specifically, although the CoMP CBF feedback codebook may be a codebook including non-unitary matrices, the single-cell SU-MIMO precoding codebook may be a subset including only unitary matrices in the CoMP CBF feedback codebook.

As described previously, the single-cell MU-MIMO feedback codebook and the single-cell SU-MIMO precoding codebook may be configured by a subset of the CoMP CBF feedback codebook. Furthermore, the single-cell MU-MIMO feedback codebook and the single-cell SU-MIMO preceding codebook may be configured by the same codebook.

From this viewpoint, since the single-cell SU-MIMO scheme, CoMP JP scheme, single-cell MU-MIMO scheme, and CoMP CBF scheme may use the same codebook or an extended codebook thereof, it may be said that a feedback codebook between different communication schemes is dynamically configured.

Feedback Mode

Generally, although a UE operating according to the single-cell MIMO communication scheme transmits feedback information only to one cell, a UE operating according to the CoMP communication scheme requires that feedback information be transmitted to a plurality of cells. It may be difficult to use a feedback mode in the single-cell MIMO communication scheme for the purpose of feedback in the CoMP communication scheme. However, it may be considered that feedback in the CoMP communication scheme is configured in an extended form of feedback in the single-cell MIMO communication scheme.

Further, since high rank transmission is generally performed in the single-cell SU-MIMO scheme and the CoMP JP scheme, a feedback mode thereof may consider feedback for high rank transmission. On the other hand, since low rank transmission is generally performed in the single-cell MU-MIMO scheme and the CoMP CBF scheme, a feedback mode thereof may consider feedback for low rank transmission.

According to the present invention, in the CoMP communication scheme and single-cell MIMO communication scheme having a mutual corresponding relationship may have scalability or a common feedback mode.

More specifically, the single-cell SU-MIMO scheme and the CoMP JP scheme may have a scalable feedback relationship. Namely, feedback information in the single-cell SU-MIMO scheme may be a subset of feedback information of the CoMP JP scheme. Moreover, the single-cell SU-MIMO scheme and the CoMP JP scheme may have a common feedback mode. In other words, the single-cell SU-MIMO scheme may be regarded a special case of the CoMP JP scheme, a CoMP set size of which is 1. A BS may inform a UE of information about the CoMP set size.

The single-cell MU-MIMO scheme and the CoMP CBF scheme may have a scalable feedback relationship. Namely, feedback information in the single-cell MU-MIMO scheme may be a subset of feedback information in the CoMP CBF scheme. The single-cell MU-MIMO scheme and the CoMP CBF scheme may have a common feedback mode. In other words, the single-cell MU-MIMO scheme may be regarded a special case of a CoMP CBF scheme, a CoMP set size of which is 1. A BS may inform a UE of information about the CoMP set size.

As described above, since the scalability or commonness of a feedback mode between the CoMP communication scheme and single-cell MIMO communication scheme having a corresponding relationship are provided, dynamic switching therebetween is facilitated.

Meanwhile, semi-static feedback mode switching may be applied between the CoMP communication scheme and single-cell MIMO communication scheme which do not have a mutual corresponding relationship. That is, feedback mode switching between one of the single-cell SU-MIMO scheme and the CoMP JP scheme and one of the single-cell MU-MIMO scheme and the CoMP CBF scheme may be semi-statically performed.

Transmission Mode

In the aforementioned CoMP communication scheme and single-cell MIMO communication scheme, various MIMO transmission modes may be used in some cases. A MIMO transmission mode may be indicated through scheduling signaling (PDCCH DCI format) and various DCI formats may be used according to various MIMO transmission modes. Generally, when different MIMO transmission modes are used according to various communication schemes, different DCI formats for indicating the transmission modes may be used.

According to the present invention, it is proposed to perform dynamic transmission mode switching between the CoMP communication scheme and single-cell MIMO communication scheme having a mutual corresponding relationship. In other words, transmission modes may be switched between the CoMP communication scheme and single-cell MIMO communication scheme having a corresponding relationship without additional signaling.

More specifically, dynamic transmission mode switching may be applied between the single-cell SU-MIMO scheme and the CoMP JP scheme. Alternatively, a single transmission mode may be applied between the single-cell SU-MIMO scheme and the CoMP JP scheme. When the single transmission mode is used in different communication schemes, even if a communication scheme is changed, the corresponding single transmission mode is not recognized by a UE and such a property may be called to be transparent. Namely, a transmission mode between the single-cell SU-MIMO scheme and the CoMP JP scheme may be called to be transparent.

In addition, dynamic transmission mode switching or a single transmission mode may be applied (i.e. transparent) between the single-cell MU-MIMO scheme and the CoMP CBF scheme.

Meanwhile, transmission mode switching between one of the single-cell SU-MIMO scheme and the CoMP JP scheme and one of the single-cell MU-MIMO scheme and the CoMP CBF scheme may be semi-statically performed.

On the other hand, dynamic transmission mode switching is applicable or a single transmission mode is applicable (i.e. transparent) between the single-cell SU-MIMO scheme, CoMP JP scheme, single-cell MU-MIMO scheme, and CoMP CBF scheme, using a Dedicated Reference Signal (DRS).

Figure 11:
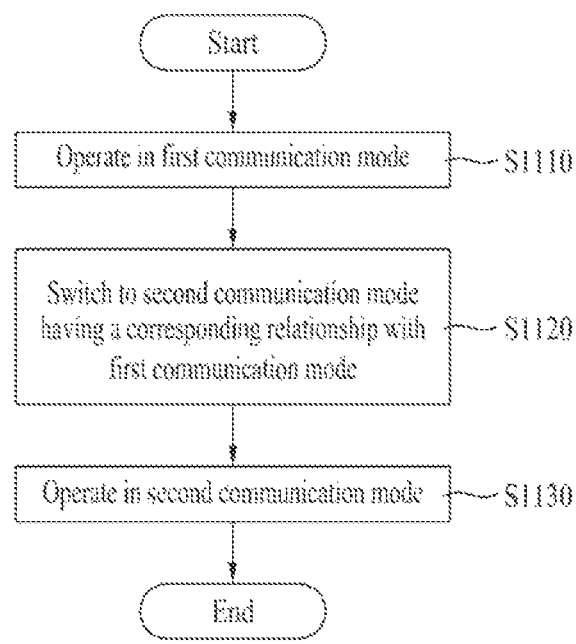
FIG. 11 is a flowchart of a dynamic switching method between a CoMP communication mode and a single-cell MIMO communication mode according to an exemplary embodiment of the present invention.

FIG. 11 is a flowchart of a dynamic switching method between a CoMP communication mode and a single-cell MIMO communication mode according to an exemplary embodiment of the present invention.

In step S1110, a UE may operate in a first communication mode. The first communication mode may be one of a CoMP communication mode and a single-cell MIMO communication mode. Here, the UE may generate and transmit channel feedback information to cells. A first feedback codebook may be used to generate the feedback information.

In step S1120, the UE may switch from the first communication mode to a second communication mode. The second communication mode is a communication mode having a corresponding relationship with the first communication mode. If the first communication mode is one of the CoMP communication mode and the single-cell MIMO communication mode, the second communication mode may be determined as the other one. In other words if the first communication mode is the CoMP communication mode, then the second communication mode may be the single-cell MIMO communication mode having a corresponding relationship with the CoMP communication mode. Alternatively, if the first communication mode is the single-cell MIMO communication mode, then the second communication mode may be the CoMP communication mode having a corresponding relationship with the single-cell MIMO communication mode. Since the first and second communication modes are communication modes having a corresponding relationship, a UE may perform communication mode switching without additional signaling from a BS. This can be said to be dynamic switching of a communication mode as described above.

More specifically, a corresponding relationship of the first communication mode and the second communication mode may be configured between the CoMP communication scheme supporting high rank transmission and the single-cell MIMO communication scheme supporting high rank transmission. That is, the corresponding relationship of the first and second communication modes may be configured between the CoMP JT scheme and the single-cell SU-MIMO scheme. Alternatively, the corresponding relationship of the first communication mode and the second communication mode may be configured between the CoMP communication scheme supporting low rank transmission and the single-cell MIMO communication scheme supporting low rank transmission. In other words, the corresponding relationship of the first and second communication modes may be configured between the CoMP CBF scheme and the single-cell MU-MIMO scheme.

In step S1130, the UE may operate according to the second communication mode. Here, the UE may generate and transmit channel feedback information to a cell or cells. A second feedback codebook may be used to generate the feedback information.

The first feedback codebook and the second feedback codebook may be the same feedback codebook. Alternatively, one of the first feedback codebook and the second feedback codebook may be configured by a subset of the other one. For example, if the first communication mode is the CoMP communication mode and the second communication mode is the single-cell MIMO communication mode, then the second feedback codebook may be configured by a subset of the first feedback codebook. (Alternatively, if the first communication mode is the single-cell MIMO communication mode and the second communication mode is the CoMP communication mode, then the first feedback codebook may be configured by a subset of the second feedback codebook.) Thus, feedback information in the single-cell MIMO communication mode may be configured by a subset of feedback information in the CoMP communication mode.

Moreover, if a corresponding relationship of the first communication mode and the second communication mode is configured between the CoMP JT scheme and the single-cell SU-MIMO scheme, the first feedback codebook and the second feedback codebook may include unitary matrices. Meanwhile, if a corresponding relationship of the first communication mode and the second communication mode is configured between the CoMP CBF scheme and the single-cell MU-MIMO scheme, the first feedback codebook and the second feedback codebook may include non-unitary matrices. A feedback codebook used in the CoMP CBF scheme and the single-cell MU-MIMO scheme may have higher granularity than a feedback codebook used in the CoMP JT scheme and the single-cell SU-MIMO scheme. The feedback codebook having higher granularity may be composed of a feedback codebook of greater size or may be configured using the aforementioned hierarchical codebook or adaptive codebook technique.

The first feedback information and the second feedback information may include CQI and/or RI information. The CQI and/or RI information may be generated based on the same hypothesis in the first communication mode and second communication mode having a corresponding relationship (i.e. single-cell MIMO communication mode and CoMP communication mode having a corresponding relationship). In addition, the same MIMO transmission scheme may be used in the first communication mode and second communication mode having a corresponding relationship (i.e. single-cell MIMO communication mode and CoMP communication mode having a corresponding relationship).

In the dynamic switching method of the communication modes according to an exemplary embodiment of the present invention described with reference to FIG. 11, details may be achieved by the above-described various proposals of the present invention.

Figure 12:
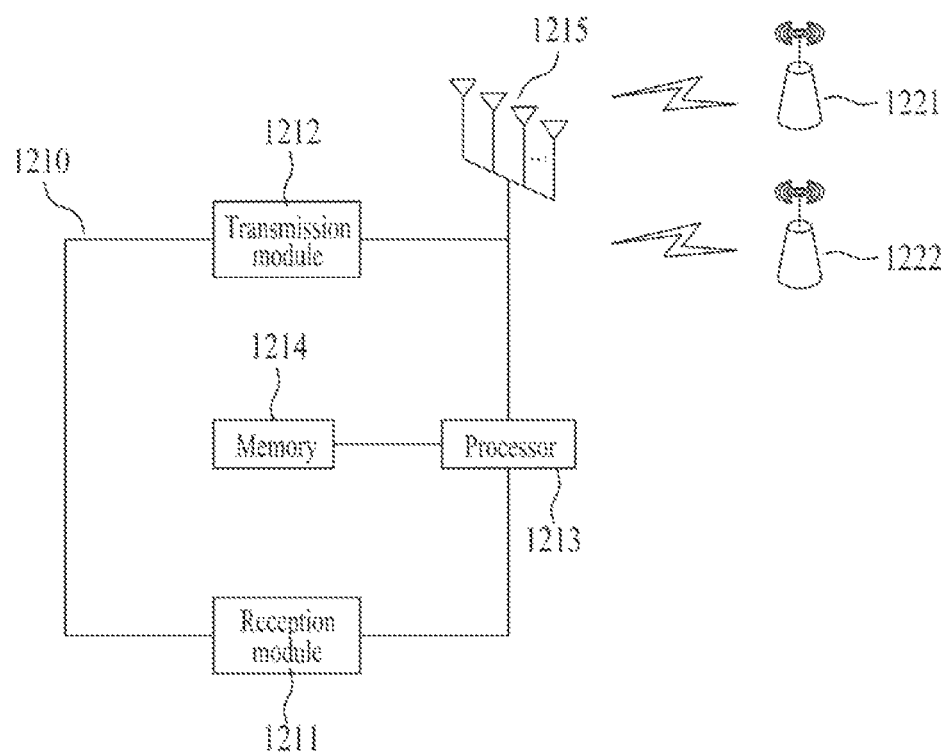
FIG. 12 is a diagram illustrating the configuration of an exemplary embodiment of a UE according to the present invention.

FIG. 12 is a diagram illustrating the configuration of an exemplary embodiment of a UE according to the present invention.

A UE 1210 may include a reception module 1211, a transmission module 1212, a processor 1213, a memory 1214, and a plurality of antennas 1215. The plurality of antennas means that the UE supports a MIMO scheme. The UE 1210 may perform multi-cell communication with a plurality of BSs 1221 and 1222.

The reception module 1211 may receive various signals, data, and information in downlink from the BSs. The transmission module 1212 may transmit various signals, data, and information in uplink to the BSs. The processor 1213 may control overall operation of the UE 1210. Especially, the processor 1213 may control transmission and reception of various signals, data, and information through the reception module 1211 and the transmission module 1212.

In the exemplary embodiment of the present invention, the UE 1210 may perform dynamic switching of a communication mode. To this end, the processor 1213 of the UE 1210 may generate first feedback information according to a first communication mode and generate second feedback information according to a second communication mode. The processor 1213 of the UE 1210 may be configured to transmit, through the transmission module, the first feedback information when the UE 1210 operates in the first communication mode and the second feedback information when the UE 1210 operates in the second communication mode. The processor 1213 may be configured to perform switching between the first communication mode and the second communication mode. The first and second communication modes are communication modes having a corresponding relationship. The first communication mode may be one of the CoMP communication and the single-cell MIMO communication mode and the second communication mode may be the other one. The processor 1213 may perform switching between the first communication mode and the second communication mode without depending on signaling from the BSs.

In relation to the configuration of the UE 1210, matters described in the various embodiments of the present invention may be applied and a repetitive description is omitted for clarity. Namely, details related to UE operation described in this document may be achieved in each element of the UE.

The processor 1213 of the UE 1210 performs an operational processing function for information received by the UE and information to be transmitted to an external device. The memory 1214 may store the processed information for a given time period and may be replaced with an element such as a buffer (not shown).

The above-described embodiments of the present invention can be implemented by various means, for example, hardware, firmware, software, or combinations thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the method according to the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. The invention should not be limited to the specific embodiments described herein, but should be accorded the broadest scope consistent with the principles and novel features disclosed herein. Also, claims that are not explicitly cited in the appended claims may be presented in combination as an exemplary embodiment of the present invention or included as a new claim by subsequent amendment after the application is filed.

INDUSTRIAL APPLICABILITY

The exemplary embodiments of the present invention as described above are applicable to a variety of mobile communication systems.

The invention claimed is:

1. A dynamic switching method of a communication mode, comprising:
   generating and transmitting first feedback information according to a first communication mode;
   switching from the first communication mode to a second communication mode which has a corresponding relationship with the first communication mode; and
   generating and transmitting second feedback information according to the second communication mode,
   wherein the first communication mode is one of a multi-cell Coordinated Multi-Point (CoMP) communication mode and a single-cell Multi-Input Multi-Output (MIMO) communication mode, and the second communication mode is the other one except for the first communication mode out of the CoMP communication mode and the single-cell MIMO mode, and
   wherein the switching is performed without relying on signaling from a base station.

2. The dynamic switching method of claim 1, wherein the corresponding relationship of the first communication mode and the second communication mode is configured between a CoMP communication scheme supporting high rank transmission and a single-cell MIMO communication scheme supporting high rank transmission, and between a CoMP communication scheme supporting low rank transmission and a single-cell MIMO communication scheme supporting low rank transmission.

3. The dynamic switching method of claim 2, wherein the CoMP communication scheme supporting high rank transmission and the single-cell MIMO communication scheme supporting high rank transmission are a CoMP Joint Transmission (JT) scheme and a single-cell Single User (SU)-MIMO scheme, respectively, and wherein the CoMP communication scheme supporting low rank transmission and the single-cell MIMO communication scheme supporting low rank transmission are a CoMP Coordinated Beamforming (CBF) scheme and a single-cell Multi User (MU)-MIMO scheme, respectively.

4. The dynamic switching method of claim 1, wherein the first feedback information and the second feedback information are generated using the same feedback codebook.

5. The dynamic switching method of claim 1, wherein the first feedback information is generated using a first feedback codebook, the second feedback information is generated using a second feedback codebook, and one of the first feedback codebook and the second feedback codebook is composed of a subset of the other one.

6. The dynamic switching method of claim 5, wherein a feedback codebook used in the single-cell MIMO communication mode is configured as a subset of a feedback codebook used in the CoMP communication mode.

7. The dynamic switching method of claim 1, wherein feedback information in the single-cell MIMO communication mode is a subset of feedback information in the CoMP communication mode.

8. The dynamic switching method of claim 1, wherein when the corresponding relationship of the first communication mode and the second communication mode is configured between a CoMP JT scheme and a single-cell SU-MIMO scheme, the first feedback information and the second feedback information are generated using a feedback codebook including unitary matrices.

9. The dynamic switching method of claim 1, wherein when the corresponding relationship of the first communication mode and the second communication mode is configured between a CoMP CBF scheme and a single-cell MU-MIMO scheme, the first feedback information and the second feedback information are generated using a feedback codebook including non-unitary matrices.

10. The dynamic switching method of claim 1, wherein, when the corresponding relationship of the first communication mode and the second communication mode is configured between a CoMP CBF scheme and a single-cell MU-MIMO scheme, the first feedback information and the second feedback information are generated using a feedback codebook having higher granularity than when the corresponding relationship of the first communication mode and the second communication mode is configured between a CoMP JT scheme and a single-cell SU-MIMO scheme.

11. The dynamic switching method of claim 10, wherein the feedback codebook having higher granularity is configured by a feedback codebook of greater size, a hierarchical codebook, or an adaptive codebook.

12. The dynamic switching method of claim 1, wherein the first feedback information and the second feedback information are generated based on the same hypothesis about Channel Quality Indicator (CQI) calculation.

13. The dynamic switching method of claim 1, wherein the same MIMO transmission scheme is used in the first communication mode and the second communication mode.

14. A user equipment for dynamically switching communication modes, comprising:
   a reception module for receiving a downlink signal from a base station;
   a transmission module for transmitting an uplink signal to the base station; and
   a processor for controlling the user equipment including the reception module and the transmission module,
   wherein the processor
   generates first feedback information according to a first communication mode and generates second feedback information according to a second communication mode,
   transmits the first feedback information through the transmission module when the user equipment operates in the first communication mode and transmits the second feedback information through the transmission module when the user equipment operates in the second communication mode, and is configured to perform switching between the first communication mode and the second communication mode, wherein the first communication mode and the second communication mode are communication modes having a corresponding relationship, wherein the first communication mode is one of a multi-cell Coordinated Multi-Point (CoMP) communication mode and a single-cell Multi-Input Multi-Output (MIMO) communication mode, and the second communication mode is the other one except for the first communication mode out of the CoMP communication mode and the single-cell MIMO mode, and wherein switching between the first communication mode and the second communication mode is performed without depending on signaling from a base station.

* * * * *